(12) United States Patent
Behr et al.

(10) Patent No.: US 8,917,390 B2
(45) Date of Patent: Dec. 23, 2014

(54) SPECTROGRAPH WITH ANAMORPHIC BEAM EXPANSION

(75) Inventors: Bradford B. Behr, Silver Spring, MA (US); Jeffrey T. Meade, Toronto (CA)

(73) Assignee: Tornado Spectral Systems inc., Toronto (CA)

( * ) Notice: Subject to any disclaimer, the term of this patent is extended or adjusted under 35 U.S.C. 154(b) by 0 days.

(21) Appl. No.: 13/531,128

(22) Filed: Jun. 22, 2012

(65) Prior Publication Data

US 2012/0327409 A1  Dec. 27, 2012

Related U.S. Application Data

(60) Provisional application No. 61/500,948, filed on Jun. 24, 2011.

(51) Int. Cl.
*G01J 3/28* (2006.01)
*G01J 3/02* (2006.01)
*G02B 27/09* (2006.01)

(52) U.S. Cl.
CPC ............... *G01J 3/28* (2013.01); *G01J 3/0205* (2013.01); *G02B 27/0911* (2013.01)
USPC ...................................................... 356/326

(58) Field of Classification Search
CPC ................................. G01J 3/0205; G01J 3/28
USPC .................. 356/300–334, 402–435
See application file for complete search history.

(56) References Cited

U.S. PATENT DOCUMENTS

| 3,510,203 | A |   | 5/1970 | Richardson |
| 4,203,652 | A | * | 5/1980 | Hanada ................... 359/669 |
| 4,678,332 | A | * | 7/1987 | Rock et al. ............... 356/328 |
| 5,789,735 | A |   | 8/1998 | Gigioli, Jr. |

(Continued)

FOREIGN PATENT DOCUMENTS

| CA | 2443494 A1 | 3/2005 |
| WO | WO 2011/038515 | 4/2011 |
| WO | WO2011038515 A1 | 4/2011 |

OTHER PUBLICATIONS

Liang Gao "Compact Image Slicing Spectrometer (ISS) for hyperspectral fluorescence microscopy", Optics Express Jul. 20, 2009.*

(Continued)

*Primary Examiner* — Kara E Geisel
*Assistant Examiner* — Maurice Smith
(74) *Attorney, Agent, or Firm* — Norton Rose Fulbright Canada LLP; Alexandre Daoust

(57) ABSTRACT

A spectrograph including light beam reformatting element(s), beam expander(s), dispersive element(s) and light receiving element(s). The light beam reformatting element(s) reformat a received light beam into a reformatted light beam having a first dimension along a first axis that is larger than a dimension of the received light beam along the first axis and a second dimension along a second axis substantially orthogonal to the first axis that is smaller than a dimension of the received light beam along the second axis. The beam expander(s) anamorphically expand the reformatted light beam along the second axis into an expanded light beam. The dispersive element(s) disperse the expanded light beam along the second axis, resulting in a dispersed light beam. The light receiving element(s) receive the dispersed light beam. The light receiving element(s) may include one or more detectors to measure spectral intensity of the dispersed light beam.

21 Claims, 4 Drawing Sheets

(56) References Cited

U.S. PATENT DOCUMENTS

| | | | | |
|---|---|---|---|---|
| 6,031,658 | A * | 2/2000 | Riza | 359/301 |
| 6,487,269 | B2 * | 11/2002 | Anderson | 378/44 |
| 6,882,775 | B1 * | 4/2005 | Peng | 385/36 |
| 7,359,051 | B2 * | 4/2008 | Shibata | 356/328 |
| 2009/0221920 | A1 | 9/2009 | Boppart et al. | |
| 2010/0328659 | A1 | 12/2010 | Bodkin | |

OTHER PUBLICATIONS

O. Cardona et al., Star Image Shape Transformer for Astronomical Slit Spectroscopy, Revista Mexicana de Astronomia y Astrofisica, 46, 431-438 (2010).

I.S. Bowen, The Image-Slicer, A Device for Reducing Loss of Light at Slit of Stellar Spectrograph, The Astrophysical Journal, vol. 88, Sep. 1938, No. 2.

International Searching Authority, Written Opinion of the International Searching Authority pertaining to PCT/CA2010/001606 dated Jan. 21, 2011.

International Searching Authority, International Search Report pertaining to PCT/CA2010/001606 dated Jan. 21, 2011.

WIPO; International Search Report and Written Opinion dated Sep. 17, 2012, issued in respect of PCT/CA2012/000615; 7 pages.

Gao, L. et al.; Compact Image Slicing Spectrometer (ISS) for hyperspectal florescence microscopy; Optical Society of America; Opt. Express; 17(15); 12293-12308, Jul. 20, 2009; Houston, Texas; pp. 1 to 24.

* cited by examiner

SPECTROGRAPH WITH ANAMORPHIC BEAM EXPANSION

CROSS-REFERENCE TO RELATED APPLICATION

The present disclosure claims priority from U.S. provisional patent application No. 61/500,948, filed Jun. 24, 2011, the entirety of which is hereby incorporated by reference.

FIELD OF INVENTION

The disclosure herein relates to optical spectrographs. In particular, the disclosure relates to spectrographs employing anamorphic beam expansion. For example, in various embodiments the present disclosure relates to spectrographs comprising integrated beam reformatters and anamorphic beam expanders.

BACKGROUND

A spectrograph is a device for measuring the intensity of light or other electromagnetic radiation as a function of wavelength (e.g., where the wavelength falls within the visible spectrum, a color wavelength). Spectrographs may be used in an enormous variety of applications, including for example the determination of physical attributes of materials, substances, or objects by analyzing spectral characteristics of light emitted by, reflected from, or transmitted through such materials, substances, or objects. At a fundamental level, a spectrograph can consist of an input aperture through which light is sent into the device, a dispersing element which bends the light beam through different angles depending on wavelength, and a camera subsystem which translates those angles into positions along a detector.

Among fundamental performance parameters of a spectrograph are (1) its bandpass, i.e., the range of wavelengths which it can detect, (2) its spectral resolution, i.e., the size of the smallest spectral feature or detail which can be discerned, and (3) its throughput, i.e., the percentage of light entering the device which is ultimately measured by the spectrograph sensor.

For many applications, bandpass, spectral resolution, and device throughput are all important. Higher spectral resolution can give a sharper view of the target spectrum, permitting a more detailed analysis, and higher throughput can provide a stronger measurable signal, improving the quality of the data (often quantified as the "signal-to-noise ratio").

Many, if not most, current conventional spectrographs represent tradeoffs between these parameters. For example, the spectral resolution of a particular spectroscopic device is often limited by the size of the image of the light input aperture as measured along the direction of dispersion. To achieve higher resolution, many spectrographs employ a "slit," such as in the form of a rectangular aperture which is narrow along a dispersion direction and relatively taller in a perpendicular dimension. A narrow slit can yield a narrow monochromatic image on the detector, and thus a sharper view of spectral features. However, a narrow slit can also block a large fraction of the input light if, for example, the initial light source is larger than the slit width. Such a spectrograph therefore typically sacrifices throughput in order to achieve higher resolution, with resultant reduced data quality. Analogous difficulties may arise where, for example, alternate light sources such as fiber optic cable or other inputs are employed.

SUMMARY

The disclosure herein presents a new approach to improvement of spectral resolution for spectrographs. Systems and devices according to the disclosure enable, among other improvements, the use of a comparatively large input aperture (which may for example allow for maximum throughput of an input source) in combination with a series of mirrors, lenses, and/or other elements configured to compress or otherwise reformat the input source image along a dispersion direction, and optionally expand or compress it in a direction generally orthogonal to the dispersion direction. This may result in the reshaped image having characteristics, in some respects, as if it has been directed through a slit, but with little or no throughput loss, for example avoiding or reducing losses such as is generally found in spectrographs employing aperture/slit combinations.

In accordance with the law of optical invariance (also known as law of étendue), there is an inverse relationship between the size of an image and the size of the corresponding collimated beam. Thus, the étendue of orthogonal axes of a light beam may be manipulated independently of each other in order to achieve a desired reshaping of an image. In various aspects the present disclosure employs anamorphic beam expanders adapted to expand light beams along one axis while leaving the beam dimension along another (e.g., orthogonal) axis unchanged. In other aspects, the present disclosure employs anamorphic beam expanders and/or compressors to expand and/or compress a light beam along both orthogonal axes.

Beam expansion typically results in a larger beam (which may require more space in the axis of expansion). Thus, in various aspects, the present disclosure employs beam reformatting to achieve a beam that is narrower along the axis of anamorphic expansion, without affecting the image size. This may allow for a larger expansion factor within a space that may be limited in the axis of anamorphic expansion.

For purposes of clarity, in the disclosure herein spectrographs are sometimes described as being oriented such that light is spectrally spread, or dispersed, in a "horizontal" direction. In such cases the term "horizontal" is intended to mean "parallel to or along a dispersion axis," and the term "vertical" is intended to mean "perpendicular or transverse to the dispersion axis." Such terminology is chosen for clarity only, and should not be taken as a suggestion that the invention will only work, or may work better, in any specific geometric, spatial, or gravitational orientation(s), or that the claims or disclosure below are to be limited to specific geometries or orientations. In the present disclosure, the term "anamorphic expansion/compression" may be used to describe expansion/compression of a light beam in one dimension while another dimension is expanded/compressed by a different amount or not at all. Anamorphic expansion/compression of a light beam may thus serve to change the aspect ratio of the cross-sectional area of the light beam.

In various embodiments, systems and/or devices according to the present disclosure may comprise some or all of the following elements, in various combinations:

One or more input apertures (e.g., optical fiber, pinhole, slit, multiple optical fibers, or other input light source);

One or more collimators (e.g., lenses, mirrors, or other devices for narrowing, focusing, or directing light beams);

One or more beam reformatters configured to use flat or other mirrors, or other reflective or refractive surfaces or devices, to subdivide and rearrange (colloquially, to "slice") beam cross-sectional shape(s), including particularly beams received from input apertures, into generally linear dispositions aligned along a first axis, e.g., "vertically";

One or more anamorphic beam expanders, to stretch (and optionally re-collimate) beams, including reformatted beam(s) horizontally (i.e., in a second direction, generally orthogonal to the first axis);

One or more single-axis beam expanders and/or compressors to expand and/or compress (and optionally re-collimate) the beam(s) along the first ("vertical") direction;

Combination(s) of the above two listed elements (i.e., combination(s) of horizontal beam expander(s) and vertical beam expander(s) and/or compressor(s)) to provide a generally parallel beam that is compressed and/or expanded in two generally orthogonal directions relative to the original input beam;

Each horizontal and/or vertical expander and/or compressor described above may also serve to recollimate beams, in which case additional collimator(s) may not be needed;

One or more dispersing elements (e.g., gratings, prisms, or other);

One or more focusing elements (e.g., camera lenses, mirrors, or other); and/or

One or more light receiving element(s), such as a light-sensitive detector(s) (e.g., single-pixel, line, array, or other) or a mirror array.

The present disclosure may provide spectrographs having increased effective spectral resolution with relatively high throughput efficiency.

In various aspects, the present disclosure provides spectrographs comprising any one or more of: at least one beam reformatter configured to reformat and/or reorient a light or other beam along a first axis; at least one beam expander configured to expand a light or other beam along a second axis (which may be substantially orthogonal to the first axis); at least one dispersive element; and at least one light receiving element for receiving light or other radiation, for example in order to measure, sense, reflect, detect, analyze or otherwise receive light or other radiation intensity. In some examples, the light receiving element may be a detector for measuring light or other radiation intensity.

In some aspects, the present disclosure provides a beam reformatter configured to reformat or reorient a light or other beam by redirecting one or more portions of the beam into a collimated composite beam having a width along a first axis that is greater than the width of the original beam along the first axis, and a width along a second axis substantially orthogonal to the first axis that is less than the width of the original beam along the second axis.

In the same or other aspects, the present disclosure provides a beam expander configured to anamorphically expand a light or other beam along a second axis by means of refraction or reflection, so that the resulting source image is compressed along that same axis.

In the same or other aspects, the present disclosure provides a spectrograph including the beam expander and/or the beam reformatter described above.

In various embodiments, a spectrograph in accordance with the disclosure may include any one or more of: at least one input light or beam source; at least one entrance or input aperture; at least one collimator; and at least one focusing element.

In further aspects and embodiments, the present disclosure provides a spectrograph that may include: at least one light beam reformatting element configured to reformat a received light beam into a reformatted light beam having a first dimension along a first axis that is larger than a dimension of the received light beam along the first axis and a second dimension along a second axis substantially orthogonal to the first axis that is smaller than a dimension of the received light beam along the second axis; at least one beam expander configured to expand the reformatted light beam along the second axis into an expanded light beam; at least one dispersive element configured to disperse the expanded light beam along the second axis, resulting in a dispersed light beam; and at least one light receiving element configured to receive the dispersed light beam.

In some examples, the light receiving element may include at least one light detector configured to measure spectral intensity of the dispersed light beam.

In some examples, the spectrograph may include at least one light source configured to generate the received light beam.

In some examples, the spectrograph may include at least one input aperture configured to receive input light, the received light beam being generated from the input light.

In some examples, the spectrograph may include at least one collimating element configured to generate a collimated light beam from input light.

In some examples, the at least one collimating element may include at least a first collimator for collimating input light substantially only along the first axis and at least a second collimator for collimating input light substantially only along the second axis.

In some examples, the spectrograph may include at least one focusing element configured to focus the dispersed light beam onto a light receiving portion of the light receiving element.

In some examples, the at least one light beam reformatting element may include a beam reformatter configured to redirect one or more portions of the received light beam to generate a composite light beam comprising one or more redirected beam portions, wherein the composite light beam has a first dimension along the first axis that is larger than a dimension of the received light beam along the first axis, and wherein the composite light beam has a second dimension along the second axis that is smaller than a dimension of the received light beam along the second axis, the composite light beam being the reformatted light beam.

In some examples, the composite light beam may include one or more not redirected beam portions.

In some examples, the at least one light beam reformatting element may include the at least one beam expander.

In some examples, the spectrograph may include the at least one light beam reformatting element, the at least one beam expander and the at least one dispersive element may be embodied in a reformatting, expanding and dispersive element comprising one or more optical elements.

In some examples, one or more optical elements of the beam expander may include at least one curved reflector.

In some examples, the spectrograph may include a second beam expander configured to expand a received light beam along the first axis.

In some examples, the spectrograph may include a compressor element configured to compress a received light beam along the first axis.

In some examples, the spectrograph may include at least one reflective optical element configured to fit the optical path between any two of the light beam reformatting element, the beam expander, the dispersive element and the light receiving element.

In some examples, at least one of the reformatting element and the beam expander may include at least one reflective optical element configured to fit the optical path within the at least one of the reformatting element and the beam expander.

In some examples, the beam expander may include the at least one reflective optical component configured to fit the optical path between a diverging component and a recollimating component of the beam expander.

In further aspects and embodiments, the present disclosure provides a spectrograph that may include: at least one beam expander configured to expand a received light beam along a first axis, resulting in an anamorphically expanded light beam; at least one light beam reformatting element configured to reformat the expanded light beam into a reformatted light beam having a first dimension along a second axis substantially orthogonal to the first axis, the first dimension of the reformatted light beam being larger than a dimension of the expanded light beam along the second axis and a second dimension along the first axis that is smaller than a dimension of the expanded light beam along the first axis; at least one dispersive element configured to disperse the reformatted light beam along the first axis, resulting in a dispersed light beam; and at least one light receiving element configured to receive the dispersed light beam.

In some examples, the light receiving element may include at least one light detector configured to measure spectral intensity of the dispersed light beam.

In further aspects and embodiments, the present disclosure provides a beam reformatter comprising: at least one optical element configured to redirect one or more portions of a received light beam to generate a reformatted light beam comprising one or more redirected beam portions; wherein the reformatted light beam has a first dimension along a first axis that is smaller than a dimension of the received light beam along the first axis.

In some examples, the reformatted light beam further includes at least one not redirected beam portion.

In some examples, the reformatted light beam may have a second dimension along a second axis substantially orthogonal to the first axis, the second dimension of the reformatted light beam being larger than a dimension of the received light beam along the second axis.

In further aspects and embodiments, the present disclosure provides a spectrograph that may include: at least one beam reformatter configured to redirect one or more portions of a received light beam to generate a reformatted light beam comprising one or more redirected beam portions; wherein the reformatted light beam has a first dimension along a first axis that is smaller than a dimension of the received light beam along the first axis; at least one dispersive element configured to disperse the reformatted light beam along the first axis or along a second axis substantially orthogonal to the first axis, resulting in a dispersed light beam; and at least one light receiving element configured to receive the dispersed light beam.

In some examples, the light receiving element may include at least one light detector configured to measure spectral intensity of the dispersed light beam.

In some examples, the reformatted light beam further may include at least one not redirected beam portion.

In some examples, the reformatted light beam may have a second dimension along the second axis, the second dimension of the reformatted light beam being larger than a dimension of the received light beam along the second axis.

DETAILED DESCRIPTION

Figure 1:
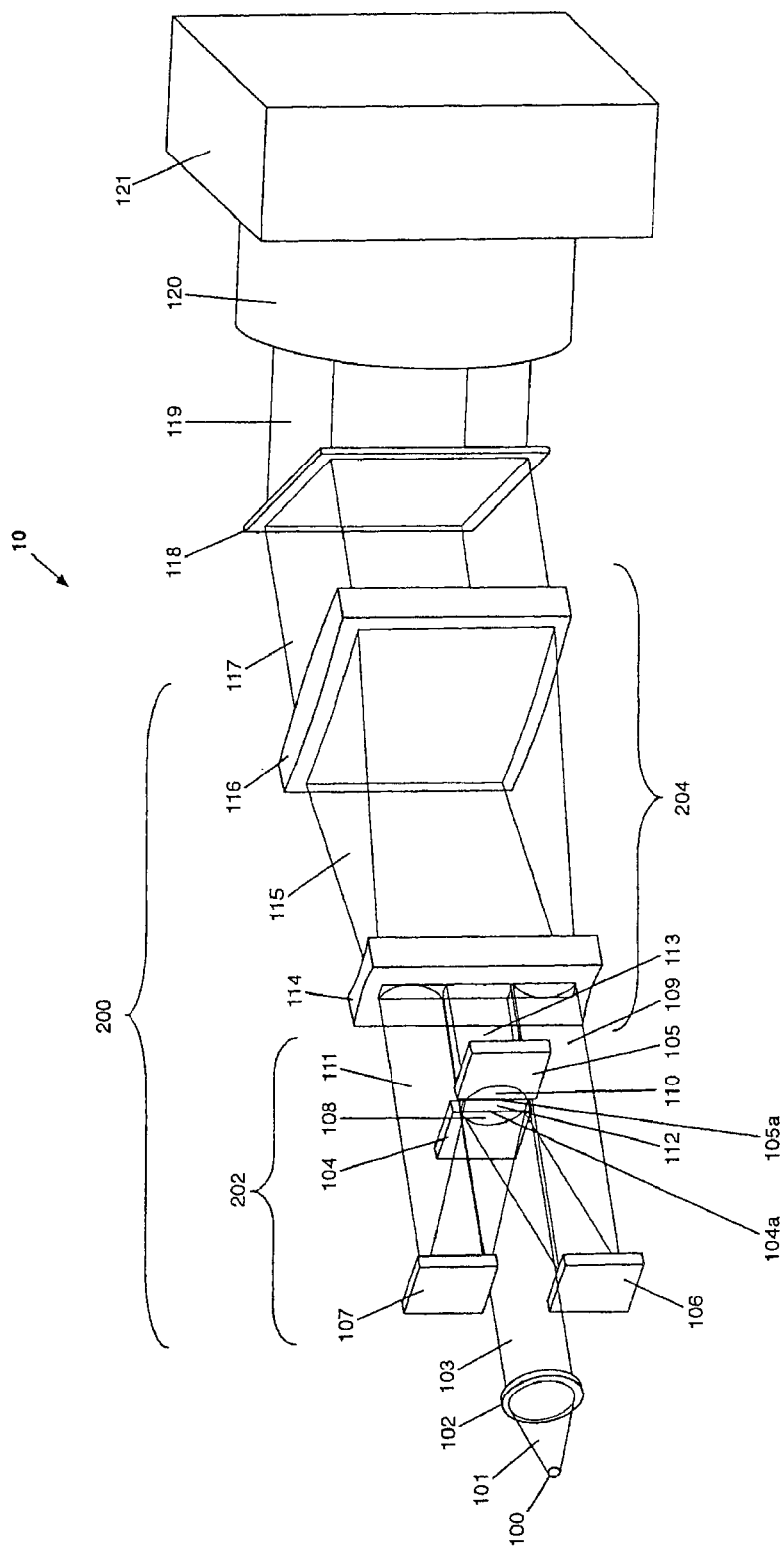
FIGS. 1-4 show schematic perspective drawings of spectrographic devices comprising various embodiments of various aspects of the disclosure herein.

FIG. 1 shows a schematic perspective diagram of an example embodiment of an anamorphically-expanding spectrograph 10 in accordance with the disclosure. In the embodiment shown, spectrograph 10 comprises a light or beam entrance aperture 100, a collimator 102, a beam reformatter 202, a beam expander 204, a dispersive element 118, a focusing element 120, and a light receiving element 121, such as a detector.

A beam of light (or other electromagnetic radiation, as desired) may be directed through the entrance aperture 100, which in this example is shown in the form of a circular aperture. The aperture 100 may alternatively be configured as one or more rectangular slits, round or otherwise-shaped optical fibers, or any other devices of type(s) and shape(s) suitable for the application(s) to be addressed.

On exiting the aperture 100, the light or other beam may diverge, for example, into a conical divergent beam such as that shown at 101, to be received into the collimator 102. The collimator 102 may be provided in the form, for example, of one or more suitably-shaped curved individual or composite lenses or mirrors, lenslets, or other suitably-configured optical components.

Collimator(s) 102 may direct the divergent beam 101 such that the divergent beam 101 is directed in the form of a parallel collimated beam 103 into beam reformatter 202 and the beam expander 204, collectively referred to as the beam reformatter and expander 200. A function of reformatter and expander 200 may be to expand substantially all, or a large portion, of the beam input received at aperture 100 in two mutually orthogonal directions, so that it is more or less evenly expanded across its entire expanded cross section. In the example embodiment of FIG. 1, the beam reformatter 202 is mounted in series with the beam expander 204. In other words, the beam reformatter 202 and the beam expander 204 are provided as separate elements where the beam reformatter 202 has a number of optical components which are not shared with the beam expander 204.

In the example embodiment shown, beam reformatter and expander 200 may include the beam reformatter 202 and the beam expander 204 as separate elements. In some examples, one or more components of the beam reformatter 202 and the beam expander 204 may be combined in the beam reformatter and expander 200. More specifically the beam reformatter and expander 200 can have a number of optical components which are commonly used for the reformatting and expanding functions of the beam reformatter 202 and the beam expander 204. In the example shown, the light is received into the beam reformatter 202 before being received into the beam expander 204, however in other examples the light may be received into the beam expander 204 before the beam reformatter 202.

The beam reformatter 202 may be configured to effectively reorient, reconfigure and/or rearrange the collimated beam 103 by splitting and redirecting the collimated beam 103 into multiple adjacent parallel beam portions, such as portions 109, 111, 113 shown in FIG. 1, so as to form a composite beam (i.e., a beam made up of the individual redirected parallel beam portions, which may be collectively referred to as a single composite beam) that may be wider along one axis (in the example shown, the vertical axis) than along a transverse (e.g., horizontal) axis.

In the example embodiment shown, the beam reformatter 202 includes a plurality of flat mirrors 104, 105, 106, 107. Mirrors 104, 105 may be spaced from each other, for example along flat or straight edges 104a, 105a, such that a portion 113 of the collimated beam 103 may pass between the mirrors 104, 105. The mirrors 104, 105 (in this example, in combination with the mirrors 106, 107) may be angled such that remaining portions 109, 111 of the collimated beam 103 may be reoriented, reconfigured, rearranged, or otherwise redirected into portions that may be aligned with each other or parallel to each other in the vertical direction, as shown. Throughout the present disclosure, the term "reformat" may be used to generally refer to the process of reorienting, reconfiguring, rearranging, or otherwise redirecting a light beam by splitting and optically manipulating portions of the light beam.

As will be understood by those skilled in the relevant arts, once they have been made familiar with this disclosure; the mirrors 104, 105, 106, 107 and/or other elements of the beam reformatter 202 may be configured to provide and re-direct as many portions 109, 111, 113 of the collimated beam 103 as are suitable or otherwise desirable for the application(s) to which a particular spectrograph 10 is to be put. For example, although the example of FIG. 1 shows the collimated beam 103 being divided into three beam portions 109, 111, 113, the collimated beam may be divided into more or fewer beam portions. In some examples, the beam portions 109, 111, 113 may, together, correspond to the whole collimated beam 103, without any overlap. In other examples, one or more portions of the collimated beam 103 may be omitted from the beam portions 109, 111, 113 and/or one or more portions of the collimated beam 103 may be overlapped among the beam portions 109, 111, 113.

In the example shown, the collimated beam 103 is reformatted into three stacked parallel beam portions 109, 111, 113, such that when the beam portions 109, 111, 113 arrive at the divergent element 114, the beam portions 109, 111, 113 may effectively form a single composite beam having a greater dimension along a first axis (e.g., the vertical direction) than across a transverse, or orthogonal axis (e.g., the horizontal direction). In some examples, such reformatting of the collimated beam 103 may result in a beam shape similar to that achieved by passing a light beam through a slit, however the reformatted beam may preserve the cross-sectional beam area of the original collimated beam 103, unlike passing a light beam through a slit. By thus reformatting the input collimated beam 103, the beam reformatter 202 may enable use of a large portion, and in many cases substantially all, of a light beam received through an input aperture 100 (which may be otherwise similar to input light beam provided by any conventional aperture), which may in turn increase throughput and/or efficiency of the spectrograph 10.

In the example embodiment shown, the collimated beam 103 is received and reflected by the flat mirrors 104, 105, 106, 107. The left portion 108 of the collimated beam 103 may be reflected by the mirror 104 and then by the mirror 106, resulting in the beam portion 109. Similarly, the right portion 110 of the collimated beam 103 may be reflected by the mirror 105 and then by the mirror 107, resulting in the beam portion 111. The central portion 112 of the original collimated beam 103 may pass through the space between the mirrors 104, 105, resulting in the beam portion 113. Although an example mirror configuration is described, other mirror geometries may be used, with fewer or more mirrors and/or different reflection sequences and/or reflection angles.

In the example shown, beam portions 109, 111, and 113 may be each of approximately the same vertical (or first axial) dimension as the original collimated beam 103, but be narrower in the horizontal dimension or along a second, substantially orthogonal direction (e.g., each beam portion 109, 111, 113 may be approximately one-third the width of the collimated beam 103 in the example embodiment shown). The mirrors 104 and 106 may be angled and positioned such that beam portion 109 may be directed to be directly below and substantially parallel to beam portion 113; likewise, the mirrors 105 and 107 may be angled and positioned such that beam portion 111 may be directed to be directly above and substantially parallel to beam portion 113; and the mirrors 104, 105, 106, 107 may be angled and positioned such that the beam portions 109, 111, 113 all line up with each other vertically and are oriented parallel to the vertical direction.

In the example shown, all three beam portions 109, 111, 113 still carry an image of the entrance aperture 100, so that if a lens with the same focal length as the lens of the collimator 102 were placed in any of these beam portions 109, 111, 113, the result would be a focused spot of light with the same size and aspect ratio as the light received by the aperture 100, however with approximately one third the light intensity. For this same reason, the spatial encoding of the input light received by the entrance aperture 100 may not be disturbed by the beam reformatter 202 and may be preserved in each of the three beam portions 109, 111, 113.

The beam reformatter 202, having effectively reformatted (e.g., split and reoriented) the collimated beam 103 into a tall, narrow composite beam (e.g., formed by beam portions 109, 111, 113) may also direct the composite beam into the divergent element 114. The beam reformatter 202 may thus provide a reformatted beam that is greater in one direction (e.g., vertically) and smaller in an orthogonal direction (e.g., horizontally) than the received collimated beam 103. In some instances, the beam reformatter 202 may be used to achieve a reformatted beam that is narrower horizontally than the received collimated beam 103. The reformatted beam may be additionally taller vertically than the received collimated beam 103, in order to preserve the total amount of received light.

Divergent element 114 may spread the composite beam 109, 111, 113 into a beam 115 that diverges along an axis or plane generally orthogonal to the axis or direction in which the composite beam was constructed. In the example shown, divergent element 114 includes one or more negative cylindrical lenses, which may cause the vertically-oriented composite beam to diverge horizontally but substantially not vertically; that is, diverge in a direction substantially orthogonal to the direction in which the dimension of the collimated beam 103 has been enlarged by the beam reformatter 202. By, for example, directing the diverging beam 115 into a second, one-dimensional collimator 116, such as a positive cylindrical lens, the diverging beam 115 may be recollimated into an expanded beam 117. The divergent element 114 and the second collimator may be collectively referred to as the beam expander 204, or horizontal or one-dimensional anamorphic beam expander.

The beam expander 204 may anamorphically expand a light beam, for example in a same direction as the narrowing (i.e., horizontally) performed by the beam reformatter 202. The beam expander 204 may achieve expansion of a light beam horizontally while unaffecting the vertical dimension of the light beam. The beam expander 204 may be realized and implemented using any suitable component, or combination of components, such as two or more positive cylindrical lenses, two or more cylindrical mirrors, a single refractive optical element with cylindrically curved front and rear surfaces, one or more anamorphic prisms, or any other optical configuration which may achieve beam expansion in one but not two orthogonal directions. In some examples, the beam expander 204 may include one or more toroidal elements, which may allow for expansion in two orthogonal directions (e.g., uneven expansion in two orthogonal directions), expansion in one direction and compression in the second orthogonal direction, or some other anamorphic expansion of a light beam.

Due to the law of optical invariance (also known as conservation of étendue), horizontal expansion of a diverging beam 115 may result in a horizontal compression of the resulting image. For instance, if the diverging beam 115 is expanded horizontally by a factor of 20 and is then focused by a lens with the same focal length as the collimator 102, the resulting image of the input aperture 100 will be 20 times narrower along the horizontal axis than if the diverging beam 115 had not been horizontally expanded. This narrowing of the input aperture image may permit the spectrograph 10 to achieve an increased spectral resolution for a given input aperture size. Furthermore, a wider beam may illuminate more grooves or lines on the dispersive element 118 (e.g., a dispersive grating), which may increase the Fourier limit on the achievable spectral resolution.

The recollimated beam 117 may be directed into a dispersive element 118, such as a transmission grating. Any other suitable spectrograph dispersing element can be used instead, such as for example a reflection grating, prism, or grism. Dispersive element 118 may spread the incoming collimated beam 117 into a spectrally-dispersed bundle of beams 119, in which, due to the laws of refraction and/or diffraction, each wavelength propagates at a different angle. The dispersed beams 119 may be directed into a camera lens or other focusing device 120, and focused into the light receiving element 121.

A light receiving element 121 may comprise any suitable device(s) for sensing, detecting, measuring, analyzing, reflecting or otherwise receiving the dispersed light beam. In some examples, the light receiving element 121 may include a detector that may comprise any suitable device(s), including, for example, one or more array sensors such as charge-coupled devices (CCDs), line sensor(s) such as a photodiode array(s), monochromator(s), and/or any other device(s) which measure light intensity as a function of input angle or linear position. In some examples, the light receiving element 121 may include a mirror array, which may be used to reflect different wavelength components of the light in different directions and/or with different intensities to create a reflected light beam with a customized or tailored spectral composition, for example.

Among the many advantages offered by apparatus configured in accordance with the present disclosure may be that, by expanding a collimated beam in only one dimension (e.g., in the horizontal direction), parallel to the dispersion axis of the spectrograph, in the manner provided by, for example, beam expander 204, spectral resolution may be increased while minimizing any increase in size of optical components and physical space, particularly in the other dimension (e.g. in the vertical direction). Furthermore, the horizontal expansion factor may be enhanced by the use of reformatting optics which may be placed in the beam path preceding the beam expander 204, including for example a reformatter 202 as described herein. A composite beam (e.g., formed by reformatted beam portions 109, 111, 113) produced by a reformatter 202 may be narrower in a first, e.g., horizontal, direction than the collimated beam 103, so that the composite beam may be horizontally expanded by a larger factor without exceeding the size of the receiving dispersive element 118 (e.g., grating) and/or the focusing device 120 (e.g., CCD camera lens), which may allow for even more spectral resolution advantage.

Figure 2:
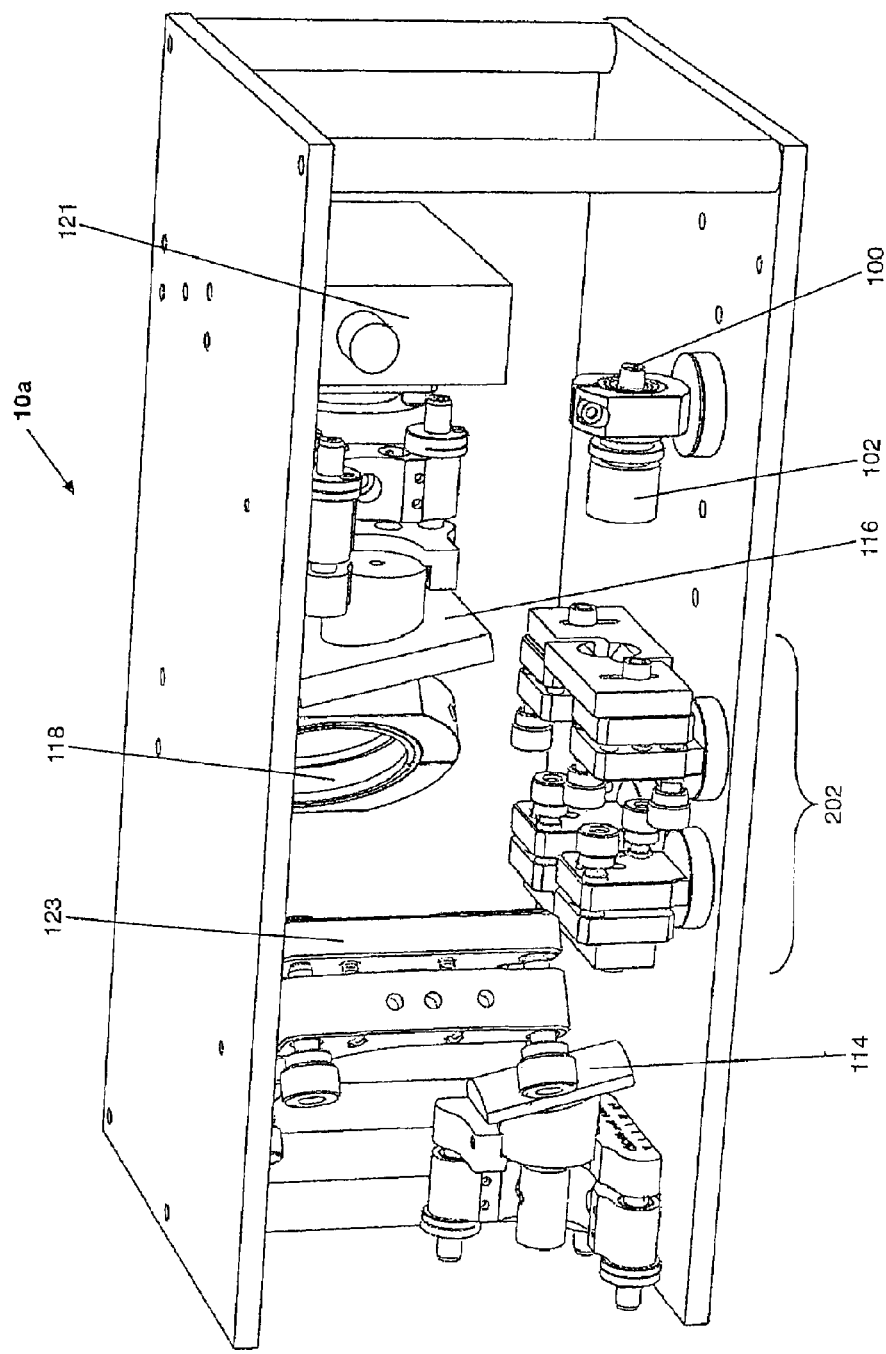
Figure 3:
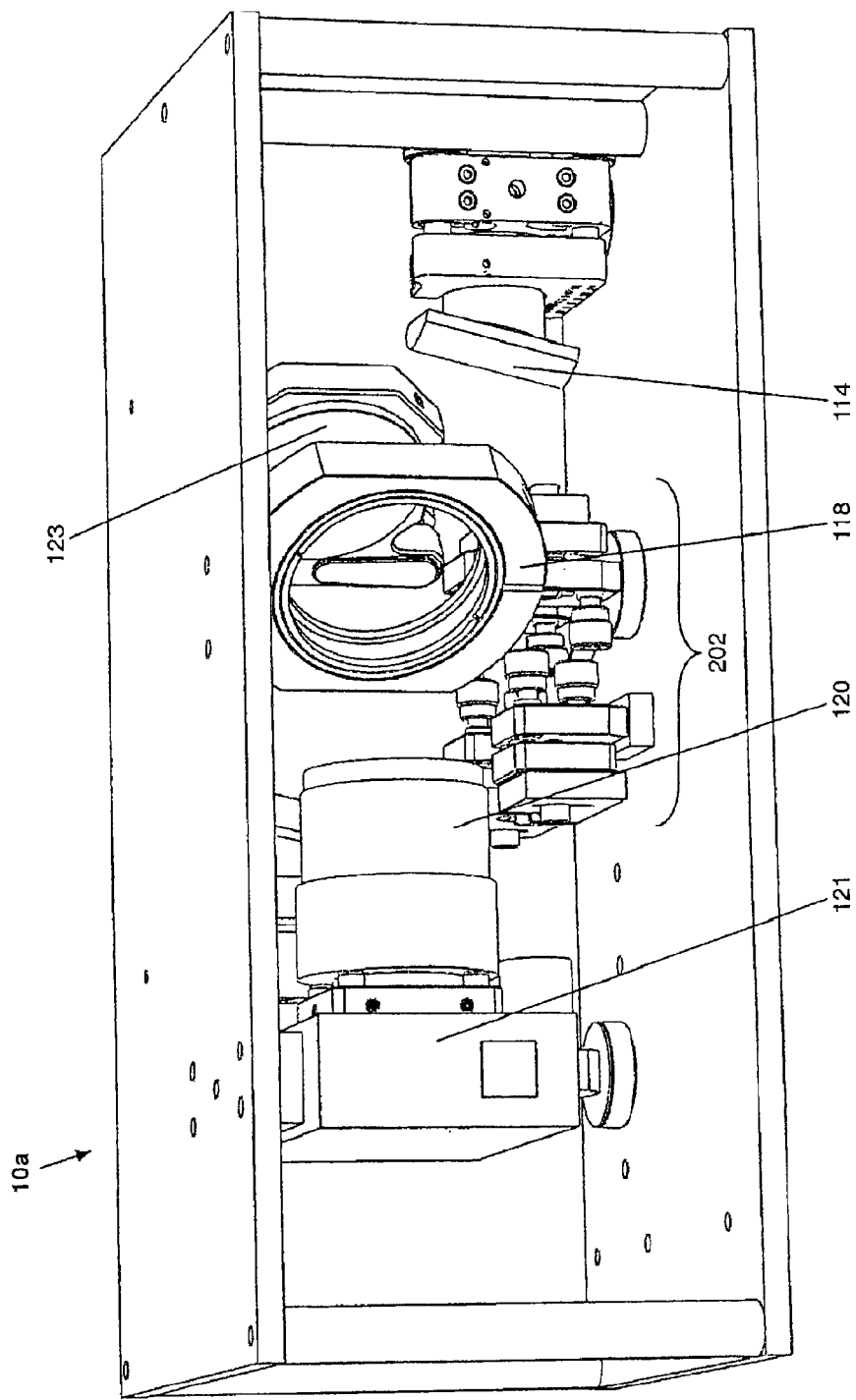
Figure 4:
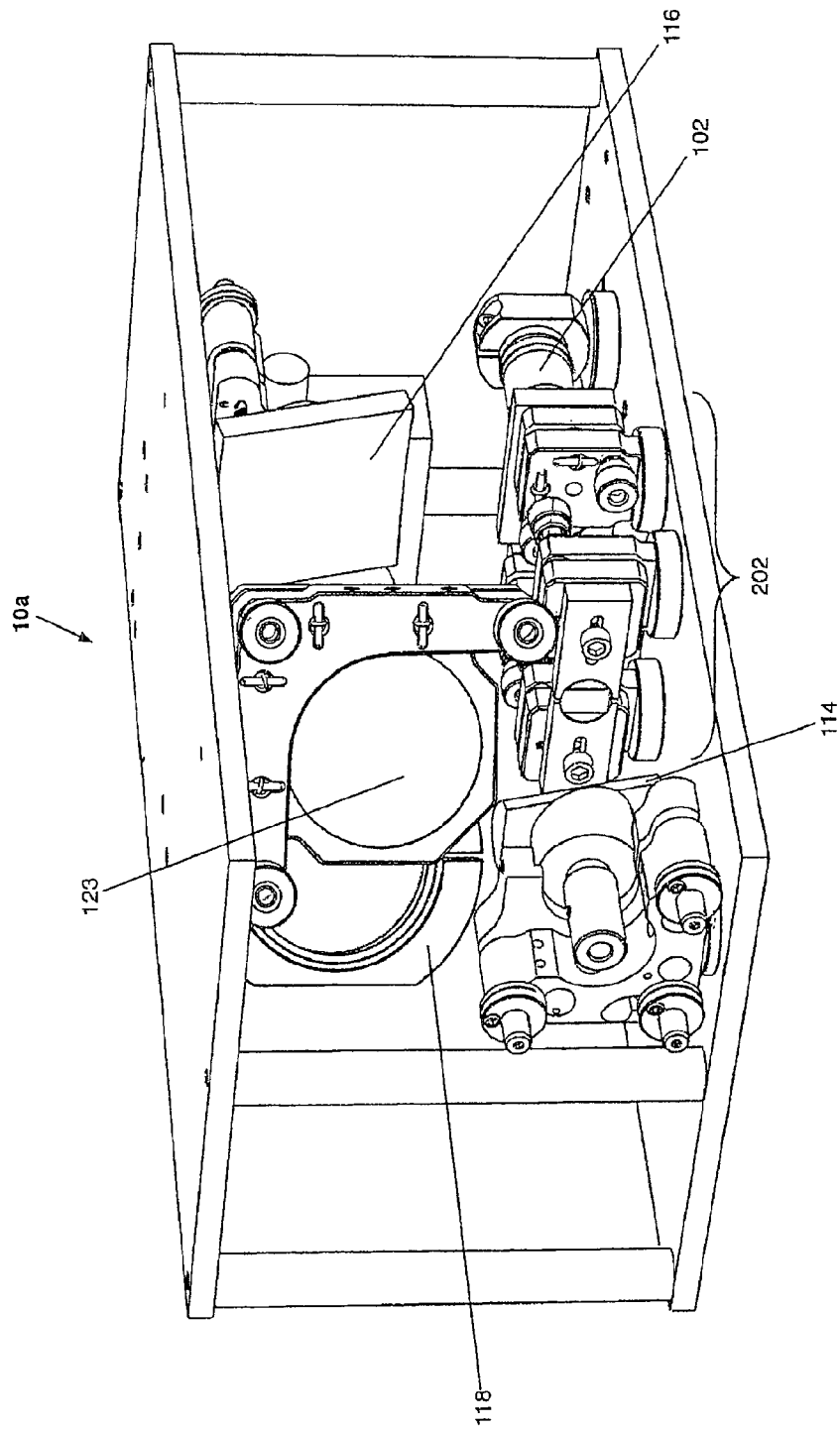

FIGS. 2-4 show another example embodiment of a spectrograph 10 in accordance with the present disclosure. As shown in FIGS. 2-4 a spectrograph 10a may include elements similar to those described above in connection with spectrograph 10 of FIG. 1; and in FIGS. 2-4 like numerals denote like elements. In the example shown, divergent element 114 and the second collimator 116 of spectrograph 10a may be implemented in the form of cylindrical mirrors instead of lenses, for example, but may function similarly to divergent element 114 and collimator 116 described in connection with spectrograph 10 of FIG. 1. In the example of FIGS. 2-4, spectrograph 10a may include a reflector 123, such as a flat fold mirror, to provide a relatively long optical pathway while fitting the optical path within a smaller physical space. In some examples, spectrograph 10a may include one or more reflective optical elements to fit the optical path between any two (or more) of the collimator 102, the beam reformatter(s) 202, the beam expander(s) 204, the dispersive element(s) 118 and the light receiving element(s) 121. In some examples, one or more reflective optical elements may be included in the collimator 102, the beam reformatter(s) 202, the beam expander(s) 204 and/or the dispersive element(s) 118, in order to fit the optical path within a smaller physical space in the collimator 102, the beam reformatter(s) 202, the beam expander(s) 204 and/or the dispersive element(s) 118. In the example shown, the reflector 123 may be positioned in the optical path between the second collimator 116 and the dispersive element 118. This may be useful in providing spectrograph 10a with a smaller footprint or in a smaller space.

In addition to the various alternative subsystem configurations noted above, for example employing flat mirrors, horizontal expanders, dispersers, and light receiving elements, among others, other variations may be used, in various applications, which may provide various additional advantages.

In some examples, one or more horizontal beam expander(s) 204 may be positioned upstream (i.e., prior to, in the order that the light encounters the optical elements) of one or more beam reformatter(s) 202, rather than downstream. In some cases, such an arrangement might require larger reformatting elements, such as mirrors, but may be useful in some situations. For example, if the collimated beam 103 has a very small diameter, then it may be difficult and/or expensive to obtain, accurately position and/or accurately align flat mirrors 104-107 in order to achieve the desired beam reformatting. In such a case, expanding the beam upstream of reformatting the beam may result in a larger beam being reformatted, which may simplify the obtaining, positioning and/or aligning of the flat mirrors 104-107.

In various embodiments, horizontal expansion and vertical reformatting of the light beam may be accomplished simultaneously (e.g., using the same optical element(s)), for example by using specifically-shaped curved mirrors (or other suitably-configured focusing optical elements) instead of flat mirrors 104-107. This option may help to reduce the size of the overall spectrograph 10, 10a and may help to improve the efficiency. In some circumstances, such a variation may result in greater optical complexity and/or component cost.

In some examples, one or more vertical compressors or expanders may be incorporated into the spectrograph 10, 10a to change the vertical size of the beam, which may be useful in various applications. For example, if the light-sensitive region of the light receiving element 121 is short in the vertical direction, a vertical beam expander positioned upstream of the light receiving element 121 in the optical path may expand the beam vertically, so that a larger portion of the focused image may land on and/or be detected in the light-sensitive region of the light receiving element 121. The vertical compressor(s) or expander(s) may be positioned in the optical path in any suitable position, for example upstream or downstream of the beam reformatter 202, upstream or downstream of the horizontal beam expander(s) 204, and/or upstream or downstream of the dispersive element 118, as appropriate.

In various examples, the collimator 102 may include multiple collimators, for example the collimator 102 may include separate horizontal and vertical collimators at different distances from the aperture 100, such that the divergent beam 101 may be directed in the form of a parallel collimated beam 103 with different horizontal and/or vertical dimensions. This option may provide a wider collimated beam 103 in one desired direction without having to also increase the size of the beam (and consequently the physical space of the spectrograph 10, 10a) in the other direction. This option may also help to reduce the total number of optical components in the spectrograph 10, 10a by providing a wider collimated beam 103 in the horizontal direction from the collimator 102 and may thus eliminate the need for the horizontal expander 204.

In some examples, the beam entrance aperture 100 may be an extended slit or other aperture, with multiple spatially distinct light sources, for example two or more optical fibers (e.g., each transmitting light from a different source) or a portion of an image projected onto the aperture 100 by an imaging system. The distinct light sources may be configured such that light beams from the sources are distinct and aligned in a vertical direction (e.g., along a slit axis, where the aperture 100 is a slit) when the light beams are received by the aperture 100. The spatial distribution of the light beams in the vertical direction, orthogonal to the dispersion direction, may be maintained throughout the reformatting, expansion, and dispersion stages, such that the light receiving element 121, which may be a detector, may distinguish among the distinct light beams and may thus simultaneously receive and/or measure two or more independent spectra, each corresponding to a light source at a specific location or range of locations on the entrance aperture 100.

In some examples, the sliced beam portions (such as beam portions 109, 111, and 113 in FIG. 1) may not be substantially parallel to each other, and may therefore land on different places on the light receiving element 121 (or multiple different light receiving elements). This may be useful, for instance where the light receiving element(s) 121 include a light detector, to avoid saturation of the detector pixels and/or to fit the beam portions through an intermediate aperture (such as the receiving aperture of a dispersion element or a camera lens) more efficiently.

Any one or more of the elements of spectrograph 10, 10a may be implemented sing one or more of the components described herein, and ether permutations or variations, in addition to those described above, may be used in various specific applications. One or more of the elements of spectrograph 10, 10a may be embodied in one or more same or shared common optical components. For example, the beam reformatter(s) 202 and the beam expander(s) 204 may be embodied in same or shared common optical component(s). Similarly, the beam reformatter(s) 202, the beam expander(s) 204 and the dispersive element(s) 118 may be embodied in same or shared common optical component(s).

In some examples, a spectrograph may include the reformatter(s) 202 without the beam expander(s) 204, depending on the application. Similar to the description above, the reformatter(s) 202 may reformat a received light beam such that the reformatted beam is narrower along a first axis (e.g., horizontal) than the original received light beam. Such a spectrograph may include the dispersive element(s) 118. Similar to the description above, the dispersive element(s) 118 may disperse the reformatted light beam along the first axis (e.g., horizontal) or along a second axis (e.g., vertical) substantially orthogonal to the first axis. Such a spectrograph may also include the light receiving element(s) 121, similar to the description above. Variations described above (e.g., inclusion of compressor(s) and reflector(s) 123) may also be implemented, depending on the application.

The embodiments of the present disclosure described above are intended to be examples only. Alterations, modifications and variations to the disclosure may be made without departing from the intended scope of the present disclosure. In particular, selected features from one or more of the above-described embodiments may be combined to create alternative embodiments not explicitly described. All values and sub-ranges within disclosed ranges are also disclosed. The subject matter described herein intends to cover and embrace all suitable changes in technology. All references mentioned are hereby incorporated by reference in their entirety.

What is claimed is:

1. A spectrograph comprising:
   at least one light beam reformatting element configured to reformat a received light beam into a reformatted light beam having a first dimension along a first axis that is larger than a dimension of the received light beam along the first axis and a second dimension along a second axis substantially orthogonal to the first axis that is smaller than a dimension of the received light beam along the second axis;
   at least one beam expander configured to expand the reformatted light beam along the second axis into an expanded light beam;
   at least one dispersive element beam configured to disperse the expanded light beam along the second axis, resulting in a dispersed light beam; and
   at least one light receiving element configured to receive the dispersed light beam.

2. The spectrograph of claim 1, wherein the light receiving element comprises at least one light detector configured to measure spectral intensity of the dispersed light beam.

3. The spectrograph of claim 1, further comprising at least one light source configured to generate the received light beam.

4. The spectrograph of claim 1, further comprising at least one input aperture configured to receive input light, the received light beam being generated from the input light.

5. The spectrograph of claim 1, further comprising at least one collimating element configured to generate a collimated light beam from input light.

6. The spectrograph of claim 5, wherein the at least one collimating element comprises at least a first collimator for collimating input light substantially only along the first axis and at least a second collimator for collimating input light substantially only along the second axis.

7. The spectrograph of claim 1, further comprising at least one focusing element configured to focus the dispersed light beam onto a light receiving portion of the light receiving element.

8. The spectrograph of claim 1, wherein the at least one light beam reformatting element comprises a beam reformatter configured to redirect one or more portions of the received light beam to generate a composite light beam comprising one or more redirected beam portions, wherein the composite light beam has a first dimension along the first axis that is larger than a dimension of the received light beam along the first axis, and wherein the composite light beam has a second dimension along the second axis that is smaller than a dimension of the received light beam along the second axis, the composite light beam being the reformatted light beam.

9. The spectrograph of claim 8, wherein the composite light beam further comprises one or more beam portions which pass directly through the at least one light beam reformatting element without being redirected thereby.

10. The spectrograph of claim 1, wherein the at least one light beam reformatting element and the at least one beam expander have at least one shared component.

11. The spectrograph of claim 1, wherein the at least one light beam reformatting element, the at least one beam expander and the at least one dispersive element have at least one shared component.

12. The spectrograph of claim 1, wherein one or more optical elements of the beam expander comprise at least one curved reflector.

13. The spectrograph of claim 1, further comprising a second beam expander configured to expand a received light beam along the first axis.

14. The spectrograph of claim 1, further comprising at least one reflective optical element configured to fit the optical path between any two of the light beam reformatting element, the beam expander, the dispersive element and the light receiving element.

15. The spectrograph of claim 1, wherein at least one of the reformatting element and the beam expander comprises at least one reflective optical element configured to fit the optical path within the at least one of the reformatting element and the beam expander.

16. The spectrograph of claim 15, wherein the beam expander comprises the at least one reflective optical element configured to fit the optical path between a diverging component and a recollimating component of the beam expander.

17. The spectrograph of claim 1, wherein the first axis and the second axis are both substantially orthogonal to a path of the received light beam.

18. The spectrograph of claim 1, wherein the received light beam and the reformatted light beam have substantially the same divergence.

19. The spectrograph of claim 1, wherein the reformatted light beam and the expanded light beam have substantially the same divergence.

20. A spectrograph comprising:

at least one beam expander configured to expand a received light beam along a first axis, resulting in an anamorphically expanded light beam;

at least one light beam reformatting element configured to reformat the expanded light beam into a reformatted light beam having a first dimension along a second axis substantially orthogonal to the first axis, the first dimension of the reformatted light beam being larger than a dimension of the expanded light beam along the second axis and a second dimension along the first axis that is smaller than a dimension of the expanded light beam along the first axis;

at least one dispersive element configured to disperse the reformatted light beam along the first axis, resulting in a dispersed light beam; and at least one light receiving element configured to receive the dispersed light beam.

21. The spectrograph of claim 20, wherein the light receiving element comprises at least one light detector configured to measure spectral intensity of the dispersed light beam.

\* \* \* \* \*